F. COLE.
APPARATUS FOR THE MANUFACTURE OF SOLID BAND TIRES.
APPLICATION FILED JAN. 29, 1920.

1,355,734. Patented Oct. 12, 1920.

Inventor
Francis Cole
Attorney

UNITED STATES PATENT OFFICE.

FRANCIS COLE, OF LEYLAND, ENGLAND.

APPARATUS FOR THE MANUFACTURE OF SOLID BAND-TIRES.

1,355,734.  Specification of Letters Patent.  Patented Oct. 12, 1920.

Application filed January 29, 1920. Serial No. 354,825.

*To all whom it may concern:*

Be it known that I, FRANCIS COLE, a British subject, residing at Leyland, county of Lancaster, England, have invented certain new and useful Improvements in Apparatus for the Manufacture of Solid Band-Tires, of which the following is a specification.

This invention relates to apparatus for the manufacture of solid band tires, and is applicable to the manufacture by either of the methods of building up the tires known as calendering or as forcing.

This invention consists in mounting the interior roller or rollers upon stationary or adjustable supports or bearings and the exterior supporting rollers in bearings carried by a cross head of hydraulic ram by which the desired pressure can be applied to the rubber as it is applied to or wrapped around the band.

Figure 1:
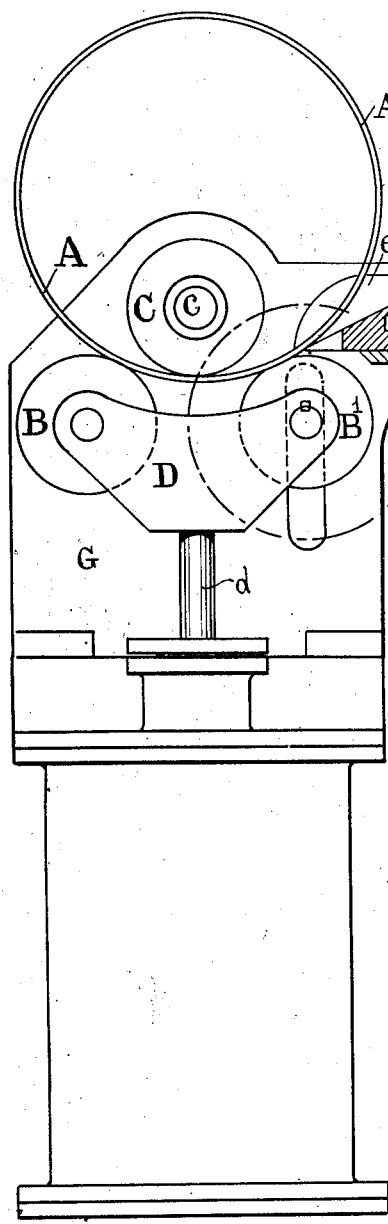
Figure 2:
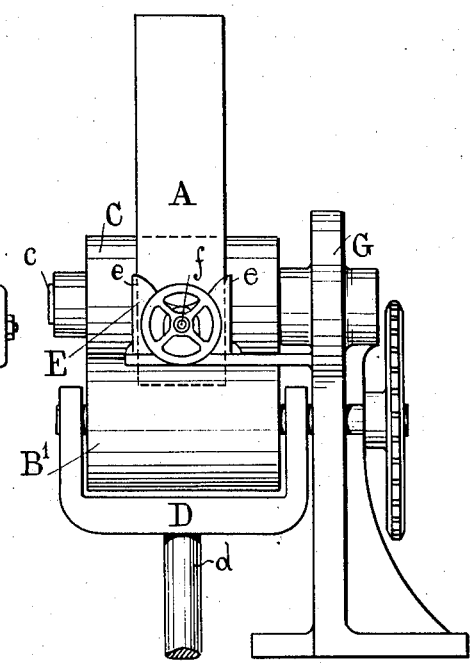
Figure 3:
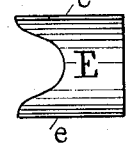
Figure 5:
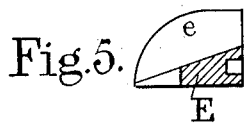
Figure 4:
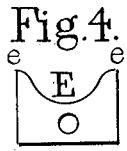

The invention will be fully described with reference to the accompanying drawings:

Figure 1 is a side elevation.
Fig. 2 is a front elevation.
Fig. 3 is a plan of guide for directing the rubber on to the band.
Fig. 4 is an end elevation of same.
Fig. 5 is a longitudinal section.

The foundation band A to which the rubber is applied rests upon and is supported by the exterior rollers B B′ and is held in position by an interior roller C. while pressure is being applied.

Two or more rollers may take the place of the single roller C.

The interior roller C. (or rollers) may be mounted to rotate on a fixed stud or support c carried by the frame G or may be journaled in fixed bearings in a suitable frame and against the interior roller or rollers any desired amount of pressure may be applied. Or the support or bearings for the roller or rollers C may be adjustable by screw or otherwise if desired.

A single roller is at present preferred set mid-way between the exterior rollers B B.

The bearings for the journals of the exterior rollers B B′ are carried by the cross head D of a hydraulic ram d which can be moved to and from the interior roller or rollers C to apply pressure to the band A when in position thereon.

A guide E with guide flanges e is mounted over the roller B′ and in front of the band A, to shape the rubber and prevent it spreading as it is built up or molded into a tire. The flanges e serve as knives or scrapers to cut off any surplus rubber from the side of the band A, and the guide E is shaped to impart the desired contour to the tire as it is built up. The guide E may rest upon a table F and is moved to and fro by a screw f or other device.

The foundation band A for the tire is placed beneath the interior roller C (or rollers) and rests upon the two rollers B B′ carried by the ram d and the latter is raised until the interior of the band is pressed against the roller C. The junction rubber is first applied preferably in strip form between the rollers and the periphery of the foundation band A, the pressure forcing the rubber into the grooves and serrations of the band as the latter revolves. The tread rubber is then applied in a similar manner from the forcing machine until the tire is completed.

By setting the valve of the hydraulic ram to open at a predetermined pressure a constant pressure may be applied to the tire as it is being built up.

What I claim as my invention and desire to protect by Letters Patent is:—

1. In apparatus for the manufacture of solid tires from a foundation band, a frame, pressure resisting means mounted on said frame and adapted to bear against the interior of the band, a hydraulic ram having a cross-head, and rollers carried by said cross-head for contacting with the rubber placed on the foundation band and exerting pressure on the exterior of said rubber under the influence of said ram.

2. In apparatus for the manufacture of solid tires from a foundation band, a frame, pressure resisting means mounted on said frame and adapted to bear against the interior of the band, means for applying pressure to the material applied to said band, a table adjacent the pressure applying means and means adjustably mounted on said table for shaping the material as the tire is built up.

3. In apparatus for the manufacture of solid tires from a foundation band, pressure resisting means in the interior of the band, exterior rollers for applying pressure to the material applied to said band, and an adjustable guide adjacent one of said rollers for shaping the material as the tire is built up.

4. In apparatus for the manufacture of solid tires from a foundation band, pressure resisting and pressure applying rollers having the band and the material applied to said band placed therebetween, a guide adapted to contact with said material for shaping the same as the tire is built up, said guide having flanges engaging the sides of the band for eliminating surplus material.

In testimony whereof I have hereunto set my hand in presence of two subscribing witnesses this 12th day of January, 1920.

FRANCIS COLE.

Witnesses:
  I. OWDEN O'BRIEN,
  GEORGE H. O'BRIEN.